United States Patent
Gorin et al.

(10) Patent No.: US 10,967,562 B2
(45) Date of Patent: Apr. 6, 2021

(54) METHOD FOR IMPROVING THE SURFACE FINISH OF ADDITIVE MANUFACTURED ARTICLES

(71) Applicant: Dow Global Technologies LLC, Midland, MI (US)

(72) Inventors: Craig F. Gorin, Midland, MI (US); Janet M. Goss, Saginaw, MI (US); Aleksander J. Pyzik, Midland, MI (US); Sharon Allen, Midland, MI (US); Sanjay C. Solanki, Midland, MI (US); Daniel P. Sophiea, Lake Orion, MI (US)

(73) Assignee: Dow Global Technologies LLC, Midland, MI (US)

( * ) Notice: Subject to any disclaimer, the term of this patent is extended or adjusted under 35 U.S.C. 154(b) by 265 days.

(21) Appl. No.: 16/099,571

(22) PCT Filed: May 19, 2017

(86) PCT No.: PCT/US2017/033461
§ 371 (c)(1),
(2) Date: Nov. 7, 2018

(87) PCT Pub. No.: WO2017/205196
PCT Pub. Date: Nov. 30, 2017

(65) Prior Publication Data
US 2019/0184628 A1 Jun. 20, 2019

Related U.S. Application Data

(60) Provisional application No. 62/340,233, filed on May 23, 2016.

(51) Int. Cl.
*B29C 64/118* (2017.01)
*C08G 18/12* (2006.01)
(Continued)

(52) U.S. Cl.
CPC .......... *B29C 64/118* (2017.08); *B29C 64/209* (2017.08); *B33Y 10/00* (2014.12);
(Continued)

(58) Field of Classification Search
CPC ....... B29C 64/118; B33Y 10/00; B33Y 30/00; B33Y 50/02
See application file for complete search history.

(56) References Cited

U.S. PATENT DOCUMENTS

| | | |
|---|---|---|
| 5,121,329 A | 6/1992 | Crump |
| 5,503,785 A | 4/1996 | Crump et al. |

(Continued)

FOREIGN PATENT DOCUMENTS

| | | |
|---|---|---|
| WO | 2012087490 | 6/2012 |
| WO | 2012151085 | 11/2012 |

(Continued)

OTHER PUBLICATIONS

Billmeyer, F.W. Jr., et. al., Textbook of Polymer Science, 1984, p. 206, ed. 3, New York.

(Continued)

*Primary Examiner* — Joseph S Del Sole
*Assistant Examiner* — Yung-Sheng M Tsui

(57) ABSTRACT

An additive elastomeric manufactured part having improved surface finish is made by repeatedly extruding through a nozzle to build up layers of a material comprised of a prepolymer comprised of an isocyanate terminated prepolymer and a filler in an amount such that the material has a shear storage modulus G' of 100,000 to 300,000 Pa measured at an oscillation rate of 1 Hz and a relaxation time of 20 seconds to 360 seconds. It has been discovered that the particular material having these rheological properties is able to improve the surface finish of the additive manufactured part without slumping and is believed to be due to (Continued)

surface flow of material into valleys between the extrudates as they are being built up.

13 Claims, 1 Drawing Sheet

(51) Int. Cl.
*C08G 18/30* (2006.01)
*B33Y 70/00* (2020.01)
*B33Y 10/00* (2015.01)
*B33Y 30/00* (2015.01)
*C08G 18/10* (2006.01)
*B33Y 50/02* (2015.01)
*C08G 18/48* (2006.01)
*B29C 64/209* (2017.01)
*C08K 3/013* (2018.01)
*C08G 18/67* (2006.01)

(52) U.S. Cl.
CPC .............. *B33Y 30/00* (2014.12); *B33Y 50/02* (2014.12); *B33Y 70/00* (2014.12); *C08G 18/10* (2013.01); *C08G 18/12* (2013.01); *C08G 18/307* (2013.01); *C08G 18/48* (2013.01); *C08G 18/672* (2013.01); *C08K 3/013* (2018.01)

(56) References Cited

U.S. PATENT DOCUMENTS

| | | |
|---|---|---|
| 5,922,809 A | 7/1999 | Bhat et al. |
| 5,976,305 A | 11/1999 | Bhat et al. |
| 6,015,475 A | 1/2000 | Hsieh et al. |
| 6,129,244 A | 10/2000 | Horth |
| 6,613,816 B2 | 9/2003 | Mahdi et al. |
| 6,709,539 B2 | 3/2004 | Zhou |
| 6,800,324 B2 | 10/2004 | Chong et al. |
| 8,123,999 B2 | 2/2012 | Priedeman, Jr. et al. |
| 8,313,006 B2 | 11/2012 | Willner et al. |
| 8,729,168 B2 * | 5/2014 | Jialanella ............... C08G 18/12 524/284 |
| 8,765,045 B2 | 7/2014 | Zinniel |
| 2002/0100550 A1 | 8/2002 | Mahdi et al. |
| 2003/0004599 A1 | 1/2003 | Herbak |
| 2003/0090034 A1 | 5/2003 | Mulhaupt et al. |
| 2011/0265932 A1 | 11/2011 | Jialanella et al. |
| 2012/0279654 A1 | 11/2012 | Jialanella et al. |
| 2013/0040091 A1 | 2/2013 | Dikovsky et al. |
| 2015/0089881 A1 * | 4/2015 | Stevenson ............ C09K 3/1409 51/309 |
| 2015/0093544 A1 | 4/2015 | Van De Vrie et al. |
| 2017/0100817 A1 * | 4/2017 | Ganapathiappan ...... C09D 4/00 |
| 2017/0355865 A1 * | 12/2017 | Fenn ................... C09D 175/02 |

FOREIGN PATENT DOCUMENTS

| | | | |
|---|---|---|---|
| WO | 2014098935 | 6/2014 | |
| WO | 2016061060 | 4/2016 | |
| WO | WO-2016061060 A1 * | 4/2016 | ............. B33Y 70/00 |

OTHER PUBLICATIONS

Sulzer Chemtech, "Mixpac Peeler II: The Clever 2-Componet Cartridge Elegantly Simple".

Blum, C., "Two-component adhesive cartridge systems," FAST, Jul. 2008.

Pandey, F., et. al., "Improvement of surface finish by staircase machining in fused deposition modeling," Journal of Materials Processing Technology, 2003, p. 323, v. 132.

* cited by examiner

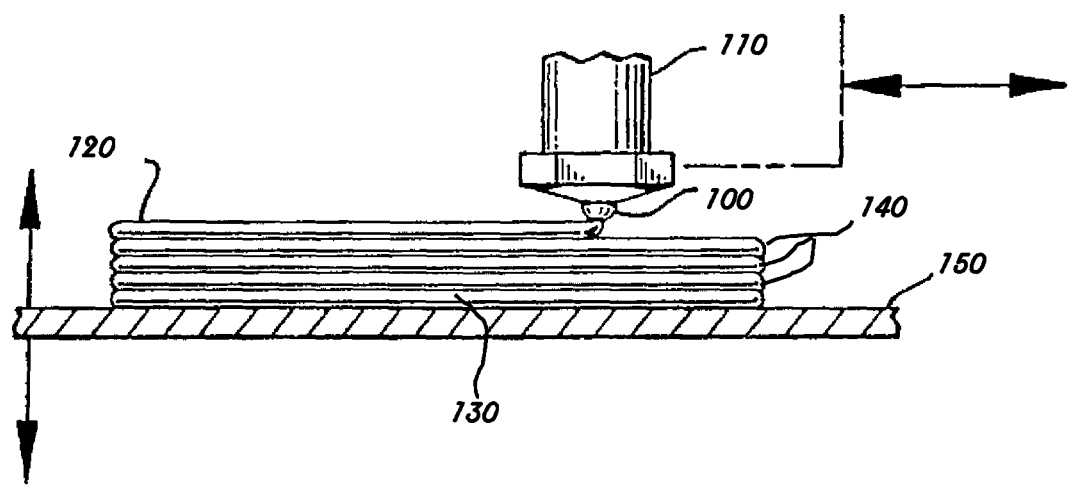

METHOD FOR IMPROVING THE SURFACE FINISH OF ADDITIVE MANUFACTURED ARTICLES

FIELD OF THE INVENTION

The invention relates to a method of additive manufacturing of thermoset polymers. In particular, the invention is an additive manufacturing method for forming elastomeric parts (e.g., polyurethane) in which the as manufactured article's surface finish is improved.

BACKGROUND OF THE INVENTION

Fused filament fabrication (FFF), which is also commonly called plastic jet printing or fused deposition modeling (FDM) has been used to form 3D parts by using thermoplastic filaments that are drawn into a nozzle, heated, melted and then extruded where the extruded filaments fuse together upon cooling (see, for example, U.S. Pat. Nos. 5,121,329 and 5,503,785). Because the technique requires melting of a filament and extrusion, the materials have been limited to thermoplastic polymers (typically nylon) and complex apparatus. The technique has required support structures that are also extruded when making complex parts that must survive the elevated temperature needed to form the part, while also being easily removed, for example, by dissolving it. Because articles are made by extruding through a nozzle, which typically are circular in cross-section and have a diameter from about 100 to 200 micrometers, the surface finish of the parts tend to be rough and have a periodicity in the Z or build direction that has required smoothing for many applications.

Recently, in co-pending application PCT/US15/055266 by A. J. Pyzik et. al., a FDM like technique was described in which thermoset materials were extruded at room temperature to form elastomeric parts. Pyzik et. al., also describe various nozzle cross-sections such as trapezoids as well as extrudate lay down patterns at least in part to try and improve the surface finish. Nevertheless, there is still a need to improve the surface finish of FDM additive manufactured parts.

It would be desirable to provide an FDM additive manufacturing method and parts made therefrom that avoid one or more of the problems of the prior art such as those described above and in particular the ability to make parts with a smoother surface finish.

SUMMARY OF THE INVENTION

A first aspect of the invention is a method of additive manufacturing comprising,
 (i) providing a material comprised of a prepolymer comprised of an isocyanate terminated prepolymer and a filler in an amount such that the material has a shear storage modulus G' of 75,000 to 300,000 Pa and a relaxation time of 20 seconds to 360 seconds,
 (ii) dispensing said material through a nozzle to form an extrudate deposited on a base,
 (iii) moving the base, nozzle or combination thereof while dispensing the material so that there is horizontal displacement between the base and nozzle in a predetermined pattern to form an initial layer of the material on the base, and (iv) repeating steps (ii) and (iii) to form a successive layer of the material adhered on the initial layer to form an additive manufactured part.

The method surprisingly enhances the surface finish of a 3D printed article. The surface finish enhancement may be improved amplitude of peak to valley heights, overall surface roughness or both. Without being limiting, it is believed the extrudates when extruded through a nozzle having a diameter of from 100 to 1000 micrometers allows for sufficient surface flow of the material upon being deposited such that it fills at least a portion of the valleys created between the extrudates, but without causing the article itself to slump. A second advantage is the improvement in the retention of Z-direction properties (including, for example, tensile strength and elongation at break) to equal or nearly equal (within, for example 10%) that of the XY direction.

The improved additive manufacturing method may be used to form an additive manufactured polymeric part. The method is particularly suited to make thermoset elastomeric parts such as those used to mitigate noise, vibration or harshness (NVH) issues in mechanical systems.

BRIEF DESCRIPTION OF THE DRAWINGS

FIG. 1 is a side view of the additive manufactured article of this invention being made by the method of this invention.

DETAILED DESCRIPTION OF THE INVENTION

The method additive manufacturing involves the use of a material comprised of a prepolymer and a filler (filled prepolymer system) where the prepolymer generally reacts under the environment it is dispensed to or with a second component simultaneously mixed and dispensed with it and forms a cross-linked or thermoset matrix. Typically, the material is dispensed into an air atmosphere at any useful or suitable temperature. Surprisingly, the material may be dispensed without any heating and retain its shape sufficiently to form an additive manufactured part. Generally, that means at least a portion or all of the prepolymer flows under shear at ambient temperature (23° C.). The use of a material having a prepolymer and filler allows for the dispensing of an extrudate that retains the shape of the nozzle opening that it is extruded through.

The material may be provided as one component or multiple components (2 or more). Generally, the material is provided as one component or two separate components. When the material is provided as one component, the prepolymer generally reacts in the atmosphere it is dispensed into such as moisture present in air to form the desired additive manufactured part. Illustratively, when the material is provided as two components (separately until dispensed), the components generally react with each other upon mixing just prior to dispensing to form the desired additive manufactured part. A component in a material provided in more than one component may have one or more constituents that react with the atmosphere also, but is not required.

When the material is provided as one component, the relative humidity (RH) of the gaseous atmosphere may be used to fine tune the surface finish without incurring deleterious slumping. Illustratively, the RH may be increased if the parts are slumping undesirably or decreased if the surface finish is rougher than desired because of the rheological properties being on the edge of the desired ranges of shear storage modulus (G') or relaxation time (A). Typically the RH is anywhere from 10% to 90% but desirably is from 25% to 75%.

Generally, the material has a high viscosity at low shear to aid in the retention of the shape after being dispensed. "High viscosity" means that the viscosity of the material or a component making up the material is at least about 10,000, 20,000, or 30,000 centipoise to about 2,000,000 or 1,000,000 centipoise. It is also preferred that if the material is provided in more than one component that each of the components has viscosity that is within about 50% of each other component under the same shear strain rate close to the strain rate expected to be used to dispense the material. "Near" means the strain rate is ±50% of the strain rate typically used to dispense the reactive materials. It is even more preferred if the viscosity is within 40%.

A useful indicative low shear measurement is one in which the viscosity is measured using a Brookfield viscometer using a number 5 spindle at the lowest rpm or using a AR2000 Rheometer available from TA Instruments, New Castle, Del. with a continuous flow method where a 4 degree cone plate of 20 mm diameter is used at 25 degree C. along with 152 micrometer gap and a shear sweep from 1 to 150 s$^{-1}$. The viscosity in centipoise at low shear is taken at a shear rate of 5 s$^{-1}$.

Likewise, the material desirably has a lower viscosity at higher shear (i.e., is shear thinning) to aid in the ease of dispensing. Generally, it is desirable for the material to have a viscosity at 100 s$^{-1}$ that is at least 2, 3, 5, 10 or even 20 or more times less than at a shear rate of 5 s$^{-1}$.

It has been discovered that for the material to realize the enhanced surface finish without slumping, the material must have a particular shear storage modulus (G') of 100,000 to 300,000 Pa and relaxation time (λ) of 20 to 360 seconds. In measuring G', the material is first mixed at high shear such as mixing in a container with paddle blades rotating at 200 rpm for about 1 minute. The material is then placed in a rheometer (e.g., AR2000 rheometer from TA Instruments) and an oscillatory stress sweep from 1 to 1000 Pa at a frequency of 1 Hz at 25° C. is performed. A suitable measuring device geometry is a 25 mm parallel plate having a gap of about 1,000 micrometers. Prior to performing the sweep, a dynamic pre-shear is used to mitigate any residual normal force caused by setting the gap of the parallel plate. A suitable dynamic pre-shear consists of a 0.01 rad displacement at a frequency of 1 Hz for about 1 min. G' is reported from the linear viscoelastic region. From the stress sweep the yield strength at the crossover point of G' and G'' (shear loss modulus) was determined. Desirably, G' is from 90,000 to 200,000 or 150,000 Pa.

In measuring λ, a stress of 2× the yield strength (determined by the stress sweep above) was applied for 60 minutes in a 25 mm parallel plate configuration with a gap of 1 millimeter. Then, a time sweep at 1 rad/s, with an oscillatory stress at 5 Pa was run for 60 minutes while measuring the strain. When the creep stress is removed, the strain recovery can be measured. Relaxation time is calculated using the TA Instruments Rheology Data Advantage software. Desirably, λ is 30, 50, 100 or 125 seconds to 300, 200 or 175 seconds. The software in essence models the strain recovery by an exponential equation such as shown in the following equation:

$$\gamma(t) = a + b[e^{-t/\lambda}]$$

where γ is the strain, a is the non-reversible deformation due to creep, and b is a material coefficient and λ is approximated as the time it takes for the strain to relax to 1/e of it's initial value after the application of the stress, or ~63.2% recovery.

It has been discovered to achieve the desirable rheological properties described above, the material is comprised of a prepolymer and filler, with the prepolymer being an isocyanate terminated prepolymer. The amount of isocyanate is present in a sufficient quantity to provide adhesive character between the extrudates during the formation of the additive manufactured part. Such prepolymers also have an average isocyanate functionality sufficient to allow the preparation of a crosslinked polyurethane upon dispensing, but and not so high that the polymers are unstable. "Stability" in this context means that the material prepared from the prepolymer has a shelf life of at least three months at ambient temperature, in that it does not demonstrate an increase in viscosity during such period which prevents its dispensing, application or use. For example, the viscosity should not rise too greatly to make it impractical to dispense. Preferably, the material does not undergo an increase in viscosity of more than about 50 percent during the stated period.

The prepolymer of the material desirably has a total NCO content which facilitates acceptable strength in parts prepared after 60 minutes and stability of the prepolymer. Total NCO content includes the NCOs from the isocyanate terminated prepolymer or unreacted isocyanates used to make the prepolymers. Preferably, the NCO content is about 0.6 percent by weight or greater based on the weight of the prepolymer and more preferably about 0.9 percent by weight or greater, and preferably about 4.0 percent by weight or less, more preferably about 3.5 percent by weight or less, even more preferably about 3.0 percent by weight or less, and even more preferably about 2.6 percent by weight or less. Below about 0.6 percent by weight, the prepolymer viscosity may be too high to handle and the working time may be too short even if dispensable.

The prepolymer exhibits a viscosity, which facilitates forming a material when mixed with the filler having the aforementioned rheology. Generally, the viscosity of the prepolymer is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity used herein is Brookfield viscosity determined using a number 5 spindle. Below about 1,000 centipoise (1 Pa s), the material prepared from the prepolymer may exhibit poor properties or the desired material rheology may be difficult to achieve. Above about 100,000 centipoise (100 Pa s) the prepolymer may be unstable and subject to very short pot lifes.

The prepolymers of the invention may have any suitable molecular weight such as an average between 10,000 to about 1,000,000 g/mole. The "molecular weight average" used herein is the z average molecular weight (Mz) molecular weight average as defined on page 206 of Textbook of Polymer Science 3rd Edition, Billmeyer, F. W. Jr., John Wiley and Sons, NY, N.Y., 1984. Desirably, the Mz average is at least in ascending desirability: 20,000, 30,000, 40,000, 50,000 and 55,000 to at most about 1,000,000, 750,000, 500,000, 400,000 or at most about 300,000. Lower Mz (i.e., less than 100,000 g/mole) may be desirable when the material contains a reactive silicon component described below.

Preferable polyisocyanates for use in preparing the illustrative prepolymer include those disclosed in U.S. Pat. No. 5,922,809 at col. 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols.

The prepolymers are made from isocyanate reactive compounds, but preferably are made using polyols such as diols and triols such as those described in U.S. Pat. No. 5,922,809 at column 4, line 60 to column 5, line 50, incorporated herein by reference. The polyols (diols and triols) are polyether polyols and more preferably polyoxyalkylene oxide polyols. The most preferred triols are ethylene oxide-capped polyols prepared by reacting glycerin with propylene oxide, followed by reacting the product with ethylene oxide.

Preferably, the polyether is chosen to decrease the polarity of the prepolymer. A significant factor in determining the polarity of the prepolymer is the amount of ethylene oxide units in the polyether used to prepare the prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the polyether prepolymer such as a polyester polyol such as those known in the art. Typically, such other polyols may be present in an amount of about up to 5% by weight of the polyols used to make said prepolymer. However, said prepolymer may be made in the absence of such polyols.

The material is also comprised of a filler that assists in the imparting of the desired rheological properties described above. An illustrative filler that is suitable is a carbon black or filler having similar characteristics (e.g., fumed silica), which are as follows.

Depending on their structure and the molecular weight of the prepolymers, the carbon black or filler having similar characteristics that may be used may range over a wide range of structures as given by oil absorption number (ASTM D-2414-09). For example, the filler desirably has an oil absorption number (OAN) of about 80 to 200 ccs per 100 grams, when the Mz of the prepolymer is about 65,000. Preferably, the oil absorption of the filler is at least about 90, more preferably at least about 100, and most preferably at least about 110 to preferably at most about 180, more preferably at most about 165 and most preferably at most about 150 ccs/100 grams.

In addition the filler desirably has an iodine number that is at least 80. The iodine number is related to the surface area of the filler, but also to the presence of volatile species such as unsaturated oils and, sulfur containing compounds in the case of carbon blacks. The iodine number is determined using ASTM D1510-11.

Even though it is not understood, it has been discovered that even when the oil absorption number is lower than 80 ccs/100 grams, the material may achieve the desired rheological properties useful in the method of this invention. For example, the material may not display sag when the product of the OAN and iodine number of the filler is generally at least 6,000. Preferably, the product of the OAN (cc/100 g) and iodine number (mg/g) is in rising preference at least 7,000; 8,000; 9,000; 10,000; 11,000; 12,000; 13,000 to at most practically obtainable such as 50,000.

The amount of filler (typically carbon black) suitable may be determined for a given filler and prepolymer molecular weight, by routine experimentation. Typically, the amount of filler is at least in ascending desirability, 10%, 15%, 16%, or 17% to, ascending 50%, 40%, 35%, 30% or 25% by weight of the material.

When a carbon black is used, it may be a standard carbon black which is not specially treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include RAVEN™ 790, RAVEN™ 450, RAVEN™ 500, RAVEN™ 430, RAVEN™ 420 and RAVEN™ 410 carbon blacks available from Colombian and CSX carbon blacks such as ELFTEX 55100 and 57100 and MONARCH 120, 570, and 590 available from Cabot, and PRINTEX™ 30 carbon black available from Evonik Industries, Mobile, Ala. Suitable non-conductive carbon blacks include RAVEN™ 1040 and RAVEN™ 1060 carbon black available from Colombian Chemicals Company, Marietta, Ga.

The material may also be comprised of reactive silicon. The reactive silicon may be present as a separate molecule such as a silane. It may be present within the backbone or as a terminal group in the prepolymer described above. The reactive silicon, generally is one that can undergo hydrolysis such as described at column 4, lines 25-55 of U.S. Pat. No. 6,613,816. Other illustrative reactive silicons may be found in U.S. Patent Publication 2002/0100550 paragraphs 0055 to 0065 and Hsieh, U.S. Pat. No. 6,015,475, column 5, line 27 to column 6, line 41, incorporated herein by reference.

The amount of reactive silicon, when present in the material is, generally, about 0.001% to 2% by weight of the total weight of the material regardless of whether it is provided in one component or more. The amount of the reactive silicon (note, the weight of the silicon itself and does not include, for example, the organic groups appended thereto), may be at least 0.005%, 0.01%, 0.02%, 0.04%, 0.06%, 0.08% or 0.1% to at most 1.8%, 1.6%, 1.4%, 1.2%, 1%, 0.8%, 0.5% of the material.

The material may also be comprised of one or more organic based polymers dispersed therein. Preferably, the organic based polymer is included in the prepolymer by inclusion of a dispersion triol having dispersed therein particles of an organic based polymer. Dispersion triols typically understood to have at least a portion of the particles being grafted with the polyol. The preferable dispersion triols are disclosed in Zhou, U.S. Pat. No. 6,709,539 at column 4, line 13 to column 6, line 18, incorporated herein by reference. Preferably, the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably, the triols used have a molecular weight of about 4,000 or greater, more preferably about 5,000 or greater and most preferably about 6,000 or greater. Preferably, such triol has molecular weight of about 8,000 or less and more preferably about 7,000 or less. It is understood that the polyol of the dispersion polyol (e.g., triol) is included in the polyol to make the prepolymer described herein, where the copolymer particles of the dispersion polyol are understood to be fillers in the composition.

Preferably, the particles dispersed in the dispersion triol comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably, the particles dispersed in the triol comprise copolymers of unsaturated nitriles, conjugated dienes and a monovinylidene aromatic monomer, a copolymer of an unsaturated nitrile and a monovinylidene aromatic monomer or a polyurea. Even more preferably, the particles comprise a polyurea or polystyrene-acrylonitrile copolymer with the polystyrene-acrylonitrile copolymers being most preferred. The organic polymer particles dispersed in the triol preferably have a particle size which is large enough to improve one or more properties such as impact properties and elastomeric properties of the finally cured additive manufactured part. The particles may be dispersed in the triol or grafted to the backbone to at least a portion of the triols if not all of them. Preferably, the particle size is about 10 micrometers or greater and more preferably the particle size is about 20 micrometers or greater.

The polyols are present in an amount sufficient to react with most of the isocyanate groups of the isocyanates leaving enough isocyanate groups to correspond with the desired free isocyanate content of the prepolymer. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

Generally, the material incorporating the illustrative prepolymer typically has a ratio of diols to triols and dispersion triols to achieve the desired cure rate and strength of the material forming the additive manufactured part. The weight ratio of diol to triol and dispersion triol, if present, is preferably about 0.8 or greater and more preferably about 0.85 or greater and most preferably about 0.9 or greater. The weight ratio of diol to triol and dispersion triol, if present, is preferably about 3.0 or less; more preferably about 2.0 or less and most preferably about 1.75 or less. In the embodiment where the polyols comprise a mixture of diols and triols, the amount of diols present is preferably about 15 percent by weight or greater based on the prepolymer, more preferably about 25 percent by weight or greater and most preferably about 28 percent by weight or greater; and about 40 percent by weight or less based on the prepolymer, more preferably about 35 percent by weight or less and most preferably about 30 percent by weight or less. In the embodiment where the polyols comprise a mixture of diols and triols, the total amount of triols (non-dispersion triol and dispersion triol) present is preferably about 15 percent by weight or greater based on the prepolymer, more preferably about 18 percent by weight or greater and most preferably about 20 percent by weight or greater; and preferably about 45 percent by weight or less based on the prepolymer, more preferably about 35 percent by weight or less and most preferably about 32 percent by weight or less.

The dispersion of organic polymer particles in a triol may be present in the prepolymer in an amount of about 10 percent by weight or greater of the prepolymer and more preferably about 12 percent by weight or greater, and about 18 percent by weight or less of the prepolymer and more preferably about 15 percent by weight or less.

The material may further comprise a plasticizer. The plasticizers may be used so as to modify the rheological properties to a desired consistency. Such materials should be free of water, inert to isocyanate groups. The plasticizers may be common plasticizers useful in polyurethane and well known to those skilled in the art and are referred hereinafter as low polar plasticizers. The plasticizer is present in an amount sufficient to disperse the prepolymer of material. The plasticizer can be added to the prepolymer either during preparation of the prepolymer or during compounding of the prepolymer prior to being placed into the first compartment. Preferably, the plasticizer is present in about 1 percent by weight or greater of the prepolymer formulation (prepolymer plus plasticizer), more preferably about 20 percent by weight or greater and most preferably about 30 percent by weight or greater. Preferably, the plasticizer is present in about 45 percent by weight or less of the prepolymer formulation and more preferably about 35 percent by weight or less.

Preferably two plasticizers are used, with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, parraffinic oils and silicone oils. Preferred low polar plasticizers include alkyl phthalates, such as diisononyl phthalates, dioctylphthalate and dibutylphthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the material is that amount which gives the desired rheological properties. The amounts disclosed herein include those amounts added during preparation of the prepolymer and during compounding of the material. Preferably, low polar plasticizers are used in an amount of about 5 parts by weight or greater based on the weight of material, more preferably about 10 parts by weight or greater, and most preferably about 18 parts by weight or greater. The low polar plasticizer is preferably used in an amount of about 40 parts by weight or less based on the total amount of material, more preferably about 30 parts by weight or less and most preferably about 25 parts by weight or less.

The amount of high polar plasticizer in material is that amount which gives the desired rheological properties and the acceptable sag and string properties of the dispensed reactive materials. Preferably, the high polar plasticizers are used in the material in an amount of about 0.2 parts by weight or greater based on the weight of material, more preferably about 0.5 parts by weight or greater, and most preferably about 1 part by weight or greater. The high polar plasticizer is preferably used in an amount of about 20 parts by weight or less based on the total amount of the material, more preferably about 12 parts by weight or less and most preferably about 8 parts by weight or less.

The prepolymer may be prepared by any suitable method, such as by reacting polyols, such as diols, triols and optionally dispersion triols such as a copolymer polyol or grafted triol, with an excess over stoichiometry of one or more polyisocyanates under reaction conditions sufficient to form a prepolymer having isocyanate functionality and free isocyanate content which meets the criteria discussed above. In a preferable method used to prepare the prepolymer, the polyisocyanates are reacted with one or more diols, one or more triols and, optionally, one or more dispersion triols. Preferable processes for the preparation of the prepolymers are disclosed in U.S. Pat. No. 5,922,809 at column 9, lines 4 to 51, incorporated herein by reference. The prepolymers are present in an amount sufficient such that when the resulting dispensed material dispensed and cure, the additive manufactured part is formed by the method. Preferably, the polyurethane prepolymers are present in an amount of about 20 parts by weight of the material or greater, more preferably about 30 parts by weight or greater and most preferably about 35 parts by weight or greater. Preferably, the prepolymers are present in an amount of about 60 parts by weight of the material or less, more preferably about 50 parts by weight or less and even more preferably about 45 parts by weight or less.

The material may further comprise a polyfunctional isocyanate, for example, to improve the modulus of the composition in the cured form or adhesion of the extrudates to each other. "Polyfunctional" as used in the context of the isocyanates refers to isocyanates having a functionality of 2 or greater. The polyisocyanates can be any monomeric, oligomeric or polymeric isocyanate having a nominal functionality of about 2.5 or greater. More preferably, the polyfunctional isocyanate has a nominal functionality of about 2.7 or greater. Preferably, the polyfunctional isocyanate has a nominal functionality of about 5 or less, even more preferably about 4.5 or less and most preferably about 3.5 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300 and N100, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates, when present are typically present in an amount sufficient to impact the modulus of the cured compositions of the invention or improve the adhesion to certain substrates described above. The polyfunctional isocyanate, when present, is preferably present in an amount of about 0.5 parts by weight or greater based on the weight of the material, more preferably about 1.0 parts by weight or greater and most preferably about 2 parts by weight or greater. The polyfunctional isocyanate is preferably present in an amount of about 8 parts by weight or less, based on the weight of the material, more preferably about 5 parts by weight or less and most preferably about 4 parts by weight or less.

The material may also contain a catalyst which catalyzes the reaction of isocyanate moieties with water or an active hydrogen containing compound, which may be in a second component. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines Mixtures of classes of catalysts may be used. A mixture of a tertiary amine and a metal salt is preferred. Even more preferred are tertiary amines, such as dimorpholino diethyl ether, and a metal alkanoate, such as bismuth octoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyltin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is present in an amount of about 60 parts per million or greater based on the weight of the material, and more preferably 120 parts by million or greater. The organotin catalyst is present in an amount of about 1.0 percent or less based on the weight of the material, more preferably 0.5 percent by weight or less and most preferably 0.1 percent by weight or less.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)ether). Tertiary amines are preferably employed in an amount, based on the weight of the material of about 0.01 parts by weight or greater, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

The material may be formulated with other optional components than those described above. By the addition of such materials, physical properties such as viscosity flow rates and the like can be modified. However, to prevent premature hydrolysis of the moisture sensitive groups of the polyurethane prepolymer, fillers should be thoroughly dried before admixture therewith. Optional components for use in the material include optional other fillers and pigments. Such fillers may include, for example, titanium dioxide, aluminum oxide, zeolite, calcium carbonate, silica, titanium oxide, silica, talc, pigments and the like. In one embodiment, more than one other filler may be used. The fillers are typically used in an amount sufficient to increase one or more desired property such as strength of the additive manufactured part or impart a particular color.

Other optional fillers may include clays. Preferred clays include kaolin, surface treated kaolin, calcined kaolin, aluminum silicates and surface treated anhydrous aluminum silicates. The clays can be used in any form, which facilitates formulation of a dispensable material. Preferably, the clay is in the form of pulverized powder, spray-dried beads or finely ground particles. Clays may be used in an amount of about 0.1 parts by weight of the material or greater, more preferably about 12 parts by weight or greater and even more preferably about 18 parts by weight or greater. Preferably, the clays are used in an amount of about 30 parts by weight or less of the material, more preferably about 28 parts by weight or less and most preferably about 24 parts by weight or less.

The material may further comprise stabilizers, which function to protect the prepolymer from moisture, thereby inhibiting advancement and preventing premature crosslinking of the isocyanates in the material. Stabilizers known to the skilled artisan for moisture curing polyurethane compositions may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the material, preferably about 0.5 parts by weight or greater and more preferably about 0.8 parts by weight or greater. Such stabilizers are used in an amount of about 5.0 parts by weight or less based on the weight of the material, more preferably about 2.0 parts by weight or less and most preferably about 1.4 parts by weight or less.

The material when it is comprised of a second component may be any that reacts the prepolymer of a first component such as described above wherein the first component is comprised of the illustrative isocyanate terminated prepolymer such as those containing reactive hydrogens such as the polyols described above or water.

In one embodiment, the second component is a paste containing water or a reactive constituent that enhances the cure of the first component of the material. A paste containing water or reactive constituent is present to speed up the cure of the material of the first component (i.e., reacts with the isocyanate groups in the first component). The use of such a paste is particularly useful when making larger parts that need to support more weight upon being formed. Examples of such second components that react with isocyanate prepolymers are described by commonly owned U.S. application No. 61/990,136 having an inventor Lirong Zhou and WO/2014/098935, each incorporated herein by reference. In a particular embodiment, the second component is comprised of a polyol having a backbone comprised of an amine group, which is further described in U.S. application No. 61/990,136.

In another embodiment of a two component system, the material is comprised of an acrylate monomer with a catalyst for forming a polyacrylic or polyacrylate are in two separate components making up the material. Said material undergoes two modes of curing to form the additive manufactured part. Exemplary materials having such two components are described by U.S. Publ. No. 2012-0279654 Int. Pub. Nos. WO/2012/151085 and WO/2012/087490.

The use of a material having 2 components may be desirable, for example, when making larger parts or faster fabrication and use is desired due to the faster increase in the modulus as the material cures. Generally, the elastic modulus is at least 0.1 MPa upon fully curing to any useful modulus, but generally is less than about 50 MPa. Desirably when making an elastomeric additive manufactured part, the fully cured modulus is at least about 0.5 MPa or 1 MPa to at most about 25 MPa, 10 MPa, or 5 MPa. The modulus may be determined by the method described by ASTM D4065 measured at 25° C. Desirably, 50% of the final cure is obtained in less than a couple of days. Preferably, 50% cure is obtained in less than a day, 12 hours, 3 or 4 hours, 1 hour or even 30 minutes.

Turning to FIG. 1, the method comprises dispensing the mixture through nozzle 100 attached to the nozzle assembly 110 where the mixture may be mixed in-line if it is provided in more than one component. Upon dispensing the mixture forms an extrudate 120 that forms an initial layer 130 and successive layers 140 on base 150. Nozzle assembly 110 is depicted being orthogonal to base, but may be set at any useful angle to form the extrudate whereby the extrudate 120 and nozzle assembly 110 form an obtuse angle with the extrudate 120 being parallel to the base. In addition, the nozzle assembly 110 may be rotated about its longitudinal axis, for example, to reorient the shape of the opening in the nozzle 100, to create extrudates 120 having differing relationship to the base 150.

The relative motion of the base 150 and nozzle assembly 110 are also shown, but it is understood that the base 150, nozzle assembly 110 or both may be moved to cause the relative motion in any horizontal direction or vertical direction. The motion is made in a predetermined manner, which may be accomplished by any known CAD/CAM methodology and apparatus such as those well known in the art and readily available robotics or computerized machine tool interface. Such pattern forming is described, for example, in U.S. Pat. No. 5,121,329.

The extrudate 120 may be dispensed continuously or disrupted to form the initial layer 130 and successive layers 140. If disrupted extrudates 120 are desired, the nozzle may be comprised of a valve (not pictured) to shut off the flow of the material. Such valve mechanism may be any suitable such as any known electromechanical valves that can easily be controlled by any CAD/CAM methodology in conjunction with the pattern.

When the mixture is comprised of more than one component, the nozzle assembly 110 may also be comprised of a mixer such as an in-line static or dynamic mixer as well as separate compartments to hold the two components. Examples of two component dispensing apparatus and methods that may be suitable include those described in U.S. Pat. Nos. 6,129,244 and 8,313,006 and U.S. Appl. No. 61/977,668 having an inventor Huide Zhu as well as those described by Sulzer Chemtech, Mixpac Peeler II product Brochure and by Craig Blum, Two Component Adhesive Cartridge Systems, FAST, July 2008.

Because the mixture may be adhesive, the base 150 may be a low surface energy material such as a polyolefin (e.g., polyethylene or polypropylene) or fluorinated polymer such as Teflon and the like. Alternatively, the base may have a mold release agent such as those known in the polyurethane reaction injection molding art or the base may have a sheet of paper or film of a low energy material placed upon it prior to dispensing and forming the additive manufactured part.

More than one nozzle assembly 110 may be employed to make composite or gradient structures within the additive manufactured part. Likewise, a second nozzle assembly 110 may be employed to dispense a support structure that may be later removed so as to allow more complex geometries to be formed such as described in U.S. Pat. No. 5,503,785. The support material may be any that adds support and be removed easily such as those known in the art, for example, waxes.

The method surprisingly may be used to make thermoset elastomeric additive manufactured parts. "Elastomeric" means that the additive part displays rubber like qualities such as at least about 50% elongation prior to break in tension. Preferably, the elongation at break under tension is at least 100%, 200% or even 300%. In a particular embodiment of such an additive manufacture part, the thermoset elastomeric additive manufactured part is comprised of polyurethane having a filler wherein the product of the oil absorption number (cc/100 g) and iodine number (mg/g) is in rising preference at least 7,000; 8,000; 9,000; 10,000; 11,000; 12,000; 13,000 to at most practically obtainable such as 50,000.

EXAMPLES

Prepolymer Preparation:

A polyether isocyanate terminated polyurethane prepolymer was prepared as described in Comparative Example 6 of U.S. Pat. No. 8,729,168 which is incorporated herein by reference.

Example 1

The material for 3D printing was made by mixing 30 g of prepolymer and 6 g filler (ELFTEX™ 57100 Carbon Black available from Cabot Corp.), 17.1% by weight, 2000 RPM for 2 minutes using a DAC 400 Speed Mixer (FlackTek Inc, Landrum S.C.) and then further mixing in 0.35 g catalyst 2,2'-dimorpholinodiethylether (DMDEE) for 2 more minutes. The filler had a OAN of about 117 cc/100 g and Iodine number of 189 mg/g. The material was then transferred into a plastic bag, and extruded into a 10 cc syringe barrel, plugged with a white Smoothflow piston, and capped with an EFD snap-on endcap, all purchased from Nordson Corporation, Westlake Ohio. The G', λ and viscosity were determined as described above and are given in Table 1.

A high pressure dispensing tool, Nordson HP4X, Nordson Corporation, Westlake Ohio, was mounted on an UltraTT EFD automated dispensing system, (Nordson Corporation, Westlake Ohio) which acts as a programmable XYZ stage. The filled syringe was loaded into the dispenser and the material pushed through a 0.41 mm luer lok tapered nozzle (7005009, Nordson Corporation. Westlake Ohio) extruded as a circular extrudate on Synaps Digital XM Polyester-Coated paper (Nekoosa Coated Products, Nekoosa Wis.) laying on the XYZ table. The material was extruded at speed of 15 mm/sec using 20 psi air pressure into 35% RH air. The XYZ table was controlled by a PalmPilot to form single-walled square tubes with side dimensions of 50 mm 40 layers of extrudates were printed in the Z-direction with a step height between layers of 0.20 mm After printing was completed, the part was removed (together with paper substrate) and allowed to cure in the 35% RH air. No delamination between individual layers was observed and adhesion was very good. No buckling of build walls or deformation of individual layers was observed. The tensile strength in the build direction (z) and perpendicular to the build direction (xy) as well as the corresponding tensile elongation in these directions were determined from ASTM D412 standard performed on a Texture Technologies TA-XT-Plus Texture analyzer (Texture Technologies Corp., Hamilton, Mass.) and are shown in Table 2.

The surface finish of the additive manufactured article was determined using a Veeco Wyko NT9100 Optical profiling system (Veeco, Plainview N.Y.) utilizing Scanning White Light Interferometery (SWLI). The non-contact three dimensional surface characteristic of surface roughness (Ra) was measured using a 50× objective with 1× field of view with scanning set points of 50 micrometer backscan, 150 micrometer scan length, and 2% modulation. A stitching profile was used to combine several scans to an array consisting of 127 micrometers×900 micrometers. The surface roughness (Ra) of a sample consisted of an average surface roughness of nine arrays (127 micrometer×900 micrometer) in which the tilt and curvature terms were removed in the data analysis. The peak to valley measurements across the printed rows were measured from the individual arrays.

Comparative Examples 1-3

Comparative Examples 1-3 were made in the same way as Example 1, but the amount of filler was varied as shown in Table 1. The surface finish and tensile properties of these parts are shown in Table 2. Comparative Example 1 displayed substantial slumping. Comparative Examples 2 and 3 made good parts, but as is quite evident in Table 2, the surface finish is substantially rougher and on the order of 5 to 10 times rougher.

TABLE 1

| Example | Carbon Black (wt %) | Viscosity (Pa · S) | Modulus (G') (Pa) | λ relaxation time (s) | Width of Part (mm) |
|---|---|---|---|---|---|
| 1 | 17.1 | 571 | 101500 | 148 | 1.2 |
| Comp. 1 | 16.5 | 531 | 60570 | 360 | 3.4 |
| Comp. 2 | 20.0 | 656 | 328500 | 18.5 | 1.1 |
| Comp. 3 | 27.5 | 3982 | 1586000 | 17 | 0.9 |

TABLE 2

| Example | Carbon Black (%) | Surface roughness at | Peak to Valley Height (μm) | Tensile Strength (XY) | Elongation at break (XY) | Tensile Strength (Z) | Elongation at Break (Z) |
|---|---|---|---|---|---|---|---|
| 1 | 17.1 | 1.87 ± 0.15 | 6.2 ± 1.2 | 6.2 MPa | 860% | 7.9 MPa | 840% |
| Comp. 1 | 16.5 | 0.93 ± 0.46 | N/A | 7.7 MPa | 730% | 7.3 MPa | 770% |
| Comp. 2 | 20.0 | 9.64 ± 0.47 | 32.9 ± 3.2 | 5.5 MPa | 1930% | 5.3 MPa | 1640% |
| Comp. 3 | 27.5 | 16.45 ± 5.75 | 50.42 ± 22.9 | 8.5 MPa | 1050% | 2.6 MPa | 370% |

What is claimed is:

1. A method of additive manufacturing comprising,
   (i) providing a material comprised of a prepolymer comprised of an isocyanate terminated prepolymer and a filler in an amount such that the material has a shear storage modulus G' of 100,000 to 300,000 Pa measured at an oscillation rate of 1 Hz and a relaxation time of 20 seconds to 360 seconds,
(ii) dispensing said material through a nozzle to form an extrudate deposited on a base,
(iii) moving the base, nozzle or combination thereof while dispensing the material so that there is horizontal displacement between the base and nozzle in a predetermined pattern to form an initial layer of the material on the base, and
(iv) repeating steps (ii) and (iii) to form a successive layer of the material adhered on the initial layer to form an additive manufactured part.

2. The method of claim 1, wherein the method further comprises repeating step (iv) such that a plurality of successive layers are adhered and built up forming the additive manufactured part.

3. The method of claim 1, wherein the prepolymer has a molecular weight average Mz of 10,000 to 500,000 g/mole.

4. The method of claim 1, wherein the material is shear thinning.

5. The method of claim 4, wherein the material has a viscosity of at least 10,000 centipoise at a shear rate of 5 s$^{-1}$ and a viscosity that is at least 10 times less at a shear rate of 100 s$^{-1}$.

6. The method of claim 1, wherein the prepolymer is comprised of a polyether isocyanate terminated prepolymer.

7. The method of claim 6, wherein the prepolymer is further comprised of an acrylate monomer, oligomer or prepolymer.

8. The method of claim 1, wherein the filler is comprised of a filler having an oil absorption number of at least 80 ccs/100 grams.

9. The method of claim 8, wherein the filler has a product of the iodine number in mg/g multiplied by the oil absorption number in ccs/100 grams of at least 6000.

10. The method of claim 1, wherein the method is performed in gaseous atmosphere having a relative humidity of 10% to 90%.

11. The method of claim 10, wherein the gaseous atmosphere is air.

12. The method of claim 1, wherein the prepolymer has a viscosity of 1000 centipoise to 30,000 centipoise.

13. The method of claim 1, wherein the filler is present in an amount of 15% to 18% by weight of the material.

* * * * *